United States Patent [19]

Yang

[11] Patent Number: 5,293,222

[45] Date of Patent: Mar. 8, 1994

[54] METHOD AND DEVICE FOR DISPLAYING A BACK-SCREEN AND CHARACTERS BY USING AN ON-SCREEN SIGNAL TO AVOID THE NEED FOR DEDICATED BACK-SCREEN CIRCUITRY

[75] Inventor: Jae-Mo Yang, Suwon, Rep. of Korea

[73] Assignee: SamSung Electronics Co., Ltd., Suwon, Rep. of Korea

[21] Appl. No.: 892,983

[22] Filed: Jun. 3, 1992

[30] Foreign Application Priority Data

Jul. 23, 1991 [KR] Rep. of Korea ............... 1991-12629

[51] Int. Cl.$^5$ ................. H04N 9/74; H04N 5/262; H04N 5/272
[52] U.S. Cl. ................................ 348/578; 348/571
[58] Field of Search ............ 358/22, 165, 183, 188; H04N 9/74, 5/262, 5/272, 3/24

[56] References Cited

U.S. PATENT DOCUMENTS

| | | | |
|---|---|---|---|
| 3,911,418 | 10/1975 | Takeda | 340/703 |
| 4,218,698 | 8/1980 | Bart et al. | 358/183 |
| 4,390,902 | 6/1983 | Chin et al. | 358/183 |
| 4,467,322 | 8/1984 | Bell et al. | 340/701 |
| 4,837,623 | 6/1989 | Motoyama | 358/165 |
| 4,953,027 | 8/1990 | Tong et al. | 358/183 |
| 4,994,905 | 2/1991 | Lee et al. | 358/183 |
| 5,003,303 | 3/1991 | Keller et al. | 358/183 |
| 5,075,766 | 12/1991 | Sendelweck | 358/22 |
| 5,130,702 | 7/1992 | Lee | 340/703 |

*Primary Examiner*—Mark R. Powell
*Assistant Examiner*—John W. Miller
*Attorney, Agent, or Firm*—Robert E. Bushnell

[57] ABSTRACT

A method and device for displaying a back-screen in a video signal processing system does not require a separate back-screen generating circuit in order to display the back-screen. Instead, an on-screen signal for indicating characters is used to display the back-screen. A determination signal is detected to determine whether a video signal input is received, and if the input video signal is not received, a microcomputer generates an extended on-screen signal to display the back-screen. If the video signal input is detected during display of the back-screen, the extended on-screen signal is blocked, stopping display of the back-screen.

20 Claims, 2 Drawing Sheets

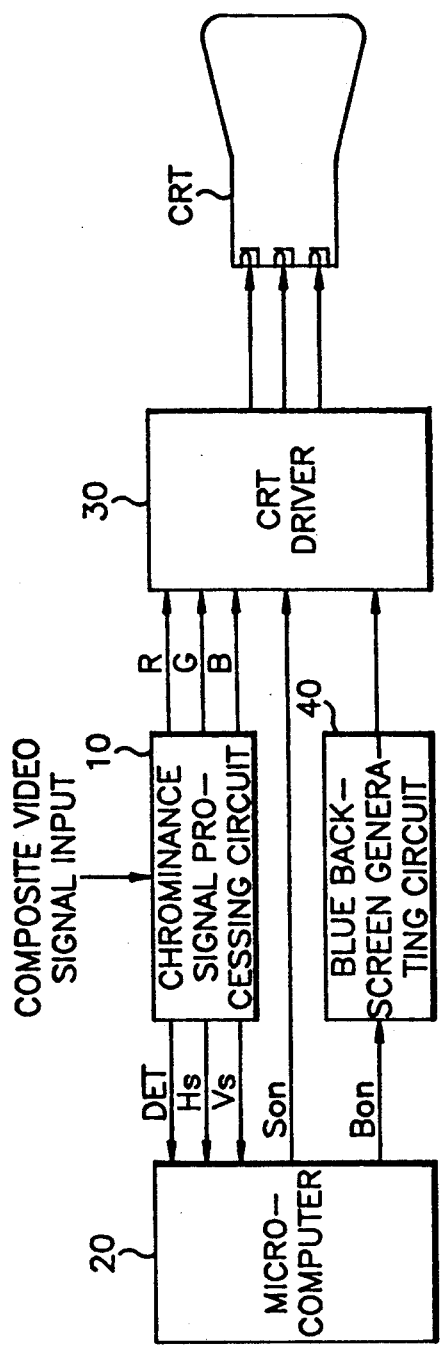
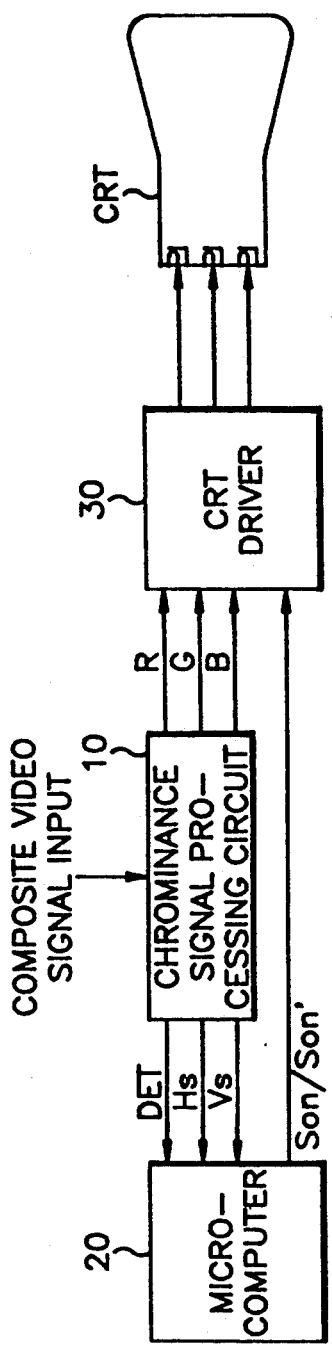

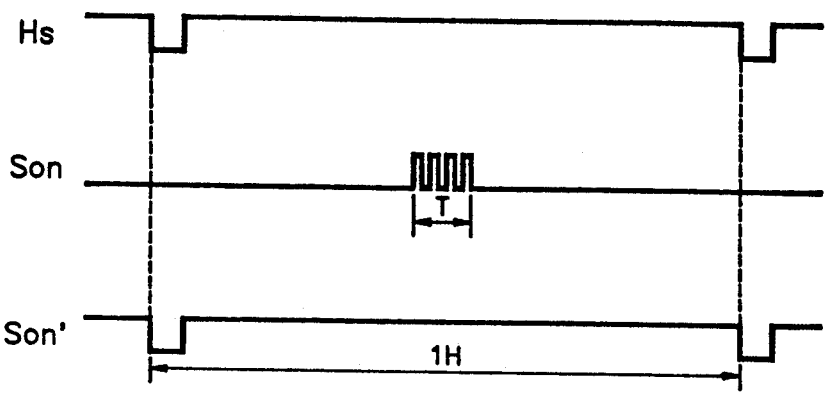
FIG. 3A Hs
FIG. 3B Son
FIG. 3C Son'
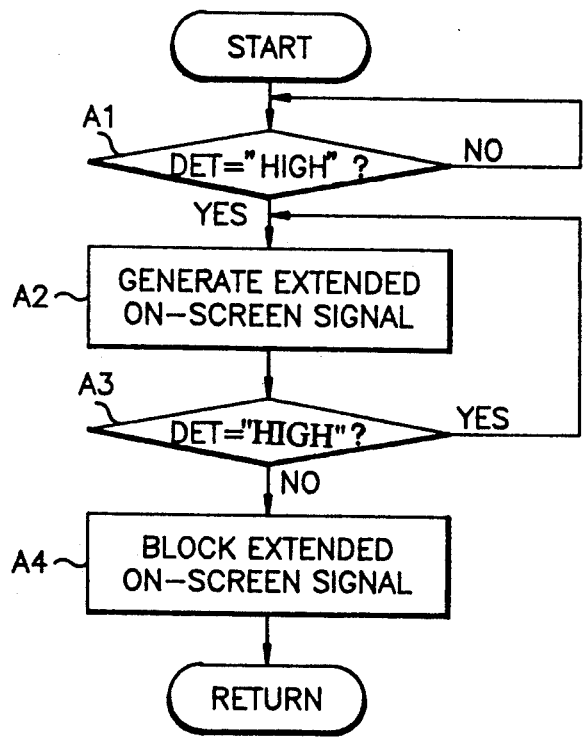
FIG. 4

METHOD AND DEVICE FOR DISPLAYING A BACK-SCREEN AND CHARACTERS BY USING AN ON-SCREEN SIGNAL TO AVOID THE NEED FOR DEDICATED BACK-SCREEN CIRCUITRY

BACKGROUND OF THE INVENTION

The present invention relates to a video signal processing system and more particularly to a method and device for displaying a back-screen by using an on-screen signal while a video signal is not received.

Generally, the video signal processing system such as a color television receiver and a video tape recorder (VTR) has a blue back-screen processing function, in which the blue back-screen is displayed on a CRT (Cathode Ray Tube) screen to eliminate and prevent noise when the video signal is not received into the video signal processing system.

FIG. 1 is a block diagram illustrating a conventional video signal processing system with a blue back-screen generating circuit 40. A chrominance signal processing circuit 10 receives a composite video signal input to generate the R (Red), G (Green), B (Blue) primary color signals, a determination signal DET indicative of whether the video signal input is received or not, and horizontal and vertical synchronizing signals Hs, Vs. A compatible one-chip IC (Integrated Circuit) such as TDA 8362 by Philips company is usually used for the chrominance signal processing circuit 10.

In most cases, the determination signal DET is at the logic "low" at the time when the horizontal synchronizing signal Hs is detected from input signal received into the chrominance signal processing circuit 10. To the contrary, if the horizontal synchronizing signal Hs is not detected due to the non-reception of the video signal input, the determination signal DET is at the logic "high". The horizontal and vertical synchronizing signals Hs, Vs of the chrominance signal processing circuit 10 are respectively synchronized with the horizontal and vertical synchronizing signals of the video signal input when the video signal input is received. If, however, the video signal input is not received, the signals generated from a local oscillator in chrominance signal processing circuit 10 will take the place of the horizontal and vertical synchronizing signals Hs, Vs. A microcomputer 20 for controlling the system, receives the determination signal DET to generate a blue back-screen drive signal Bon for driving the blue back-screen when the determination signal DET indicates that video signal input is not received. The microcomputer 20 also generates an on-screen signal Son to display characters on the screen. A blue back-screen generating circuit 40 receives the blue back-screen drive signal Bon to displayed a blue screen. A CRT driver 30 receives the R, G, B primary color signals transmitted from the chrominance signal processing circuit 10 to drive a CRT to display an image of the video signal input on the screen or to display the CRT screen blue, in response to the output signal of the blue back-screen generating circuit 40. In addition, the CRT driver 30 can display characters on the screen according to the on-screen signal Son transmitted from the microcomputer 20.

The conventional device for displaying the blue back-screen includes a separate blue back-screen generating circuit, thus complicating the circuitry with the increased number of components.

SUMMARY OF THE INVENTION

It is an object of the present invention to provide a method and a device for displaying a back-screen by using an on-screen signal for displaying characters, without employing a separate back-screen generating circuit in a video signal processing system.

According to the present invention, the method for displaying a back-screen by using an on-screen signal includes the steps of:

detecting a determination signal indicative of whether a video signal is being received;

generating an extended on-screen signal when the video signal input is not received to display the back-screen in association with the extended on-screen signal; and blocking the extended on-screen signal at the time when the video signal input is received and the back-screen is being displayed, to stop displaying the back-screen.

BRIEF DESCRIPTION OF DRAWINGS

For a better understanding of the invention and to show how the same may be carried into effect, reference will now be made, by way of example, to the accompanying diagrammatic drawings, in which:

FIG. 1 is a block diagram of a conventional back-screen processing system;

FIG. 2 is a block diagram of a back-screen processing system according to the present invention;

FIG. 3A is a horizontal synchronizing signal waveform of the back-screen processing system shown in FIG. 2;

FIG. 3B is an on-screen signal waveform for displaying characters according to the present invention when a video signal input is received, FIG. 3C is an extended on-screen signal waveform for displaying a back-screen according to the present invention when the video signal input is not received; and FIG. 4 is a flow chart for illustrating a back-screen process according to the present invention.

DETAILED DESCRIPTION OF A PREFERRED EMBODIMENT

Hereinafter, a preferred embodiment of the present invention will be specifically described with reference to FIGS. 2 to 4.

Referring to FIG. 2, a back-screen processing system according to the present invention has a CRT, a chrominance signal processing circuit 10, a microcomputer 20 and a CRT driver 30. It should be noted that the conventional blue back-screen generating circuit 40 of FIG. 1 is not included in the system of the present invention.

The chrominance signal processing circuit 10 has the same function as that of FIG. 1, and therefore is not specifically described. The microcomputer 20 generates an on-screen signal Son or an extended on-screen signal Son' in response to the determination signal DET transmitted from the chrominance signal processing circuit 10. The CRT driver 30 drives the CRT to display the R, G, B primary color signals transmitted from the chrominance signal processing circuit 10 or to display the back-screen in response to the extended on-screen signal Son' generated by the microcomputer 20.

Referring to FIG. 3A, a reference character Hs represents a horizontal synchronizing signal generated by the chrominance signal processing circuit 10.

The on-screen signal Son for displaying characters is produced during the character display period T within 1H (one horizontal scanning period) as shown in FIG. 3B. At this time, the CRT driver 30 drives the CRT to display characters in response to the on-screen signal Son as well as the R, G, B primary color signals transmitted from the chrominance signal processing circuit 10.

Meanwhile, when the determination signal DET indicates that the video signal input is not received, the microcomputer 20 generates the extended on-screen signal Son' shown in FIG. 3C for displaying the back-screen. The extended on-screen signal is a signal of which pulse width is extended to the horizontal scanning period by being synchronized with the horizontal synchronizing signal Hs. Then the CRT driver 30 drives the CRT to display the back-screen by activating a predetermined one of the R, G, B cathodes upon receiving the extended on-screen signal Son' transmitted from the microcomputer 20. Alternatively, the back-screen may be displayed in any desired color by activating the R, G, B cathodes in a given combination according to the user's choice.

FIG. 4 is a flow chart of the operational steps of the method for displaying the back-screen according to the present invention. In step A1, the microcomputer 20 detects whether the determination signal DET transmitted from the chrominance signal processing circuit 10 is "high" or "low" in order to determine whether the video signal input is received.

When the determination signal DET is detected as "high", the video signal input is not received, so the microcomputer 20 generates and transfers the extended on-screen signal Son' shown in FIG. 3C, to the CRT driver 30 in order to drive the CRT to display the back-screen in the predetermined R, G, B colors in step A2. In this case, the extended on-screen signal Son' is synchronized with the horizontal and vertical synchronizing signals Hs, Vs generated by a local osillator in the chrominance signal processing circuit 10, and therefore also synchronized with the horizontal and vertical scanning of the CRT. In step A3, when the extended on-screen signal Son' lasting one horizontal scanning period ends, i.e. the next horizontal synchronizing signal Hs is detected, the determination signal DET is again detected. If the determination signal DET is "high", step A2 is repeated, while if the determination signal DET is "low" indicative of rece of the video signal input, step A4 is executed to block the extended on-screen signal Son' in order to stop the back-screen displaying. The video signal input is then displayed on the CRT.

The color of the back-screen may be determined by causing the CRT driver 30 to apply the extended on-screen signal Son' to one of the R, G, B cathodes of the CRT. Of course, it is possible that any desired colors may be used for displaying the back-screen by a given combination of R, G, B cathode colors.

As stated above, the method and device according to the present invention does not require a separate back-screen generating circuit in order to display the back-screen. Instead, the conventional on-screen signal for displaying characters is used to display the back-screen. Thus, manufacturing cost of the system is reduced and the circuitry is simplified.

While the invention has been particularly shown and described with reference to a preferred embodiment, it will be understood by those skilled in the art that modifications in detail may be made without departing from the spirit and scope of the invention.

What is claimed is:

1. A method of a back-screen processing system, comprising the steps of:
    detecting a determination signal indicative of whether a video signal is received;
    generating an extended on-screen signal in a microcomputer and transferring said extended on-screen signal to a cathode ray tube driver when the video signal is not received, said microcomputer being directly connected to said cathode ray tube driver for directly transferring of said extended on-screen signal from said microcomputer to said cathode ray tube driver;
    displaying a back-screen on a visual display in response to the extended on-screen signal; and
    disabling said back-screen from being displayed on said visual display by blocking said extended on-screen signal from being transferring directly from said microcomputer to said cathode ray tube driver when said video signal is received.

2. The method as claimed in claim 1, wherein said step of generating the extended on-screen signal comprises the steps of:
    generating said extended on-screen signal for a first horizontal scanning period if said video signal is not received;
    maintaining said extended on-screen signal if said video signal continues not to be received during a next horizontal scanning period; and
    stopping said generating of said extended on-screen signal if said video signal is received.

3. The method as claimed in claim 2, wherein said extended on-screen signal is synchronized with synchronizing signals, said synchronizing signals corresponding to said video signal.

4. The method as claimed in claim 1, wherein said extended on-screen signal is synchronized with horizontal and vertical synchronizing signals corresponding to the video signal, and generated by a chrominance signal processing means.

5. The method as claimed in claim 1, wherein a color of said back-screen is determined by applying said extended on-screen signal selectively to the cathode ray tube driver in accordance with primary color cathodes in a cathode ray tube.

6. A device for displaying a back-screen in a video signal processing system, said device comprising:
    chrominance signal processing means for processing a composite video signal and generating a determination signal and synchronizing signals corresponding to the composite video signal;
    means for controlling the back-screen on a visual display by generating one of an on-screen signal and an extended on-screen signal and transmitting a generated signal representative of one of said on-screen signal and said extended on-screen signal via a single transmission line in dependence upon said determination signal and said synchronizing signals; and
    means, directly connected to said controlling means via said single transmission line, for driving a cathode ray tube in response to said generated signal to enable an alternative display of on-screen characters on said visual display if said generated signal is representative of said on-screen signal and said back-screen on said visual display if said generated signal is representative of said extended on-screen signal.

7. The device as claimed in claim 6, wherein said chrominance signal processing means further comprises a local oscillator for generating said synchronizing signals when said composite video signal is not received.

8. The device as claimed in claim 6, wherein said controlling means comprises means for extending a pulse width of said on-screen signal to one horizontal scanning period corresponding to a period of said synchronizing signals when said composite video signal is not received.

9. A method for displaying a back-screen in a video signal processing system comprising the steps of:
generating a determination signal, synchronizing signals and primary color signals in dependence upon reception of a video signal;
alternatively generating an on-screen signal in a microcomputer for enabling a display of on-screen characters on a visual display, and an extended on-screen signal in said microcomputer for enabling a display of said back-screen on said visual display in dependence upon said determination signal and said synchronizing signals;
driving, in a cathode ray tube driver, a cathode ray tube for displaying said on-screen characters on said visual display in accordance with said on-screen signal and said primary color signals, and for displaying said back-screen on said visual display in accordance with said extended on-screen signal, said cathode ray tube driver being directly connected to said microcomputer via a single transmission line, and said single transmission line transferring one of said on-screen signal and said extended on-screen signal directly from said microcomputer to said cathode ray tube driver; and
blocking said extended on-screen signal when said video signal is received, to disable said back-screen from being displayed on said visual display.

10. The method as claimed in claim 9, wherein said step of generating the extended on-screen signal comprises the steps of:
generating said extended on-screen signal for a first horizontal scanning period if said video signal is not received;
maintaining said extended on-screen signal if said video signal continues not to be received for a next horizontal scanning period; and
disabling the generation of said extended on-screen signal if said video signal is received.

11. The method as claimed in claim 10, wherein said extended on-screen signal is synchronized with said synchronizing signals, said synchronizing signals corresponding to said video signal.

12. The method as claimed in claim 9, wherein said extended on-screen signal is synchronized with said synchronizing signals corresponding to the video signal.

13. The method as claimed in claim 9, wherein a color of said back-screen is determined by applying said extended on-screen signal to the cathode ray tube driver in accordance with primary color cathodes in said cathode ray tube.

14. The method as claimed in claim 9, wherein said on-screen signal and said extended on-screen signal are alternatively generated in dependence upon said determination signal, said extended on-screen signal having a pulse width extended to a horizontal scanning period in synchronous with said synchronizing signals and being generated when said determination signal indicates the non-reception of said video signal, and said on-screen signal being generated during a character display period within said horizontal scanning period when said determination signal indicates the reception of said video signal.

15. A device for displaying a back-screen in a video signal processing system, said device comprising:
generating means for generating an on-screen signal when a video signal is received during a character display period, and generating an extended on-screen signal when the video signal is not received, said character display period being synchronized with a horizontal synchronization component of said video signal, and said extended on-screen signal having a pulse width extended to a period of the horizontal synchronization component; and
driving means, directly connected to said generating means, for driving a display of the back-screen on a visual display in response to the extended on-screen signal, said back-screen exhibiting a color in dependence upon selection by a user.

16. A device for displaying a back-screen in a video signal processing system, comprising:
chrominance processor means coupled to receive composite video signals, for processing said composite video signals to generate a plurality of color signals, synchronizing signals and a control signal, said control signal being indicative of whether said composite video signals have been received by said chrominance processor means;
controller means, responsive to said synchronizing signals and said control signal, for generating control signals representative to one of on-screen signals and extended on-screen signals, said on-screen signals representing on-screen characters for enabling a display of said on-screen characters on a visual display when said control signal indicates that said composite video signals have been received by said chrominance processor means, and said extended on-screen signals representing the back-screen for enabling a display of said back-screen on said visual display when said control signal indicates that said composite video signals have not been received by said chrominance processor means; and
driver means, directly connected to said controller means to receive said control signals, for driving one of said on-screen signals and said extended on-screen signals to enable a display of said one of said on-screen characters and said back-screen on said visual display in accordance with a selected color from said plurality of color signals.

17. The device as claimed in claim 16, further comprised of said extended on-screen signals having a pulse width extended to a horizontal scanning period in synchronous with said synchronizing signals.

18. The device as claimed in claim 17, further comprised of said on-screen signals being generated during a character display period within said horizontal scanning period.

19. The device as claimed in claim 16, wherein said on-screen signals and said extended on-screen signals are alternatively generated in dependence upon said control signal.

20. The device as claimed in claim 16, wherein said on-screen signals and said extended on-screen signals are alternatively generated by said controller means, and extended on-screen signals having a pulse width extended to a horizontal scanning period in synchronous with synchronizing signals of said composite video signals, and said on-screen signals being generated during a character display period within said horizontal scanning period.

* * * * *

UNITED STATES PATENT AND TRADEMARK OFFICE
CERTIFICATE OF CORRECTION

PATENT NO. : 5,293,222
DATED : March 8, 1994
INVENTOR(S) : Jae-Mo Yang

It is certified that error appears in the above-indentified patent and that said Letters Patent is hereby corrected as shown below:

Column 1,    Line 55,    Change "displayed" to --display-- ;

Column 2,    Line 20,    Change "to stop displaying" to --ending display of-- ;

Column 3,    Line 51,    Change "rece" to --reception-- .

IN THE CLAIMS

Column 6,    Line 39,    After "representative", Change "to" to --of-- ;

Column 7,    Line 6,     Preceding "extended", Change "and" to --said-- .

Signed and Sealed this

Twenty-first Day of February, 1995

Attest:

BRUCE LEHMAN

Attesting Officer    Commissioner of Patents and Trademarks